(12) United States Patent
Yamanaka et al.

(10) Patent No.: US 10,919,923 B2
(45) Date of Patent: Feb. 16, 2021

(54) ORGANIC PHOSPHORUS-BASED COMPOUND, AND FLAME RETARDANT AND FLAME-RETARDANT PRODUCT COMPRISING THE SAME

(71) Applicant: TEIJIN LIMITED, Osaka (JP)

(72) Inventors: Katsuhiro Yamanaka, Osaka (JP); Kenta Imazato, Osaka (JP); Naoshi Takahashi, Osaka (JP)

(73) Assignee: TEIJIN LIMITED, Osaka (JP)

( * ) Notice: Subject to any disclaimer, the term of this patent is extended or adjusted under 35 U.S.C. 154(b) by 9 days.

(21) Appl. No.: 16/328,891

(22) PCT Filed: Mar. 10, 2017

(86) PCT No.: PCT/JP2017/010815
§ 371 (c)(1),
(2) Date: Feb. 27, 2019

(87) PCT Pub. No.: WO2018/051553
PCT Pub. Date: Mar. 22, 2018

(65) Prior Publication Data
US 2019/0218237 A1 Jul. 18, 2019

(30) Foreign Application Priority Data

Sep. 16, 2016 (JP) .............................. JP2016-181730

(51) Int. Cl.
*C07F 9/6574* (2006.01)
*C09K 21/12* (2006.01)
(52) U.S. Cl.
CPC ........ *C07F 9/65746* (2013.01); *C07F 9/6574* (2013.01); *C09K 21/12* (2013.01)
(58) Field of Classification Search
CPC ..... C07F 9/65746; C07F 9/6574; C09K 21/12
USPC ........................................................ 558/78
See application file for complete search history.

(56) References Cited

U.S. PATENT DOCUMENTS

| | | | |
|---|---|---|---|
| 3,141,032 | A | 7/1964 | Friedman |
| 4,154,721 | A | 5/1979 | Valdiserri et al. |
| 4,174,343 | A | 11/1979 | Hardy et al. |
| 4,178,281 | A | 12/1979 | Horn, Jr. |
| 2006/0116526 | A1 | 6/2006 | Tanabe et al. |
| 2012/0053265 | A1 | 3/2012 | Angell et al. |
| 2013/0018128 | A1 | 1/2013 | Yao et al. |

FOREIGN PATENT DOCUMENTS

| | | |
|---|---|---|
| EP | 1 586 576 | 10/2005 |
| GB | 1 487 609 | 10/1977 |
| JP | 53-39698 | 4/1978 |
| JP | 54-157156 | 12/1979 |
| JP | 05-163288 | 6/1993 |
| JP | 2003-267984 | 9/2003 |
| JP | 2004-010586 | 1/2004 |
| JP | 2004-010587 | 1/2004 |

(Continued)

OTHER PUBLICATIONS

Machine translation of JP 2016044165 A , Aug. 24, 2020 (Year: 2020).*

(Continued)

*Primary Examiner* — Kristin A Vajda
(74) *Attorney, Agent, or Firm* — Wenderoth, Lind & Ponack, L.L.P.

(57) ABSTRACT

An organic phosphorus-based compound which satisfies the following requirements (i) to (viii) and is represented by the following formula (1): (i) the organic purity should be not lower than 98%; (ii) the solubility in 20° C. water should be not higher than 0.1 g/100 g of water; (iii) the total halogen component content should be not higher than 1,000 ppm; (iv) the total volatile organic matter content should be not higher than 800 ppm; (v) the Δ pH value should be not larger than 1.0; (vi) the volume standard median diameter should be not larger than 30 μm; (vii) the maximum particle diameter should be not larger than 200 μm; and (viii) the standard deviation represented by the following formula should be not larger than 20 μm. Standard deviation= (d84%+d16%)/2; wherein d84%: particle diameter at a point where the cumulative curve becomes 84% (μm), and d16%: particle diameter at a point where the cumulative curve becomes 16% (μm).

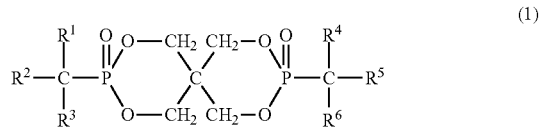

(1)

In the above formula, $R^2$ and $R^5$ may be the same or different and are each a phenyl group which may have a substituent, naphthyl group which may have a substituent, anthryl group which may have a substituent, or branched or linear alkyl group having 1 to 4 carbon atoms which may have an aromatic substituent. $R^1$, $R^3$, $R^4$ and $R^6$ may be the same or different and are each a hydrogen atom, branched or linear alkyl group having 1 to 4 carbon atoms, phenyl group which may have a substituent, naphthyl group which may have a substituent, or anthryl group which may have a substituent.

6 Claims, No Drawings

(56) References Cited

FOREIGN PATENT DOCUMENTS

| | | |
|---|---|---|
| JP | 2004-010588 | 1/2004 |
| JP | 2004-018380 | 1/2004 |
| JP | 2004-018381 | 1/2004 |
| JP | 2004-018382 | 1/2004 |
| JP | 4287095 | 7/2009 |
| JP | 2012-527469 | 11/2012 |
| JP | 2013-525276 | 6/2013 |
| JP | 2016-044165 | 4/2016 |
| JP | 2016-216382 | 12/2016 |
| WO | 2004/060900 | 7/2004 |
| WO | 2014/157598 | 10/2014 |

OTHER PUBLICATIONS

International Search Report dated Apr. 18, 2017 in International (PCT) Application No. PCT/JP2017/010815 with English translation.
International Preliminary Report on Patentability dated Mar. 19, 2019 in International (PCT) Application No. PCT/JP2017/010815.
Supplementary European Search Report dated Jul. 18, 2019 in European Patent Application No. 178504619.9.

\* cited by examiner

US 10,919,923 B2

ORGANIC PHOSPHORUS-BASED COMPOUND, AND FLAME RETARDANT AND FLAME-RETARDANT PRODUCT COMPRISING THE SAME

TECHNICAL FIELD

The present invention relates to an organic phosphorus-based compound having high flame retardancy and a good appearance, and a flame retardant and a flame-retardant product comprising the same.

BACKGROUND ART

Polymer materials typified by polycarbonate resin, polyphenylene oxide resin, polyester resin, ABS resin, styrene resin, epoxy resin and polyamide resin are used in a wide variety of fields such as mechanical parts, electric parts and auto parts as molding materials, fiber materials, and film/sheet materials by making use of their excellent physical properties. Meanwhile, since these polymer materials are substantially combustible, when they are used for the above purposes, safety to flames, that is, high flame retardancy is required in most cases in addition to balance among general chemical and physical properties.

To provide flame retardancy to the polymer materials, a method in which a halogen-based compound as a flame retardant and an antimony compound as a flame-retardant auxiliary are added to a resin is commonly employed. However, this method has a problem that a large amount of a corrosive gas is generated at the time of molding or combustion. Further, environmental impacts at the time of the disposal of products are now concerned. Then, a halogen-free flame retardant and a halogen-free flame retarding prescription are strongly desired.

As means of flame retarding a polymer material without using a halogen-based flame retardant, there is widely known a method in which a metal hydrate such as aluminum hydroxide or magnesium hydroxide is added. However, to obtain sufficiently high flame retardancy, a large amount of the above metal hydrate must be added, thereby losing the characteristic properties of the polymer material disadvantageously. Further, according to the type and use of a polymer, there exist uses in which the metal hydrate cannot be used basically from the viewpoint of production process.

A triaryl phosphoric acid ester monomer or an aromatic phosphoric acid ester of a condensate phosphoric acid ester oligomer has been frequently used as a flame retardant for providing flame retardancy to an organic polymer. However, the triaryl phosphoric acid ester monomer typified by triphenyl phosphate greatly degrades the heat resistance of a composition and produces a large amount of a gas at the time of extrusion, molding, spinning or film formation as it has high volatility, thereby causing a handling problem. Further, when a polymer material is heated at a high temperature, at least part of this compound is lost from a resin through volatilization or bleeding. Although the condensate phosphoric acid ester oligomer has improved volatility, as most of it is liquid, a liquid injection device is required to knead it with a polymer material which requires a hot melt kneading step, thereby involving a handling problem at the time of extrusion kneading.

Meanwhile, various studies are being made mainly on disubstituted pentaerythritol diphosphonate as a flame retardant for resins. By blending this compound with a thermoplastic resin, the flame retardation of the thermoplastic resin is made possible. A thermoplastic resin composition comprising this phosphonate compound does not experience the deterioration of heat resistance and impact resistance caused by blending the flame retardant and is not lost from a resin through volatilization at the time of kneading or bleeding.

There are disclosed several methods of producing the above disubstituted pentaerythritol diphosphonate. For example, Patent Document 1 discloses a Production Example in which diphenyl pentaerythritol diphosphonate is obtained through a reaction between pentaerythritol and phenyl phosphonic acid dichloride.

Patent Document 2 discloses a Production Example in which the corresponding disubstituted pentaerythritol diphosphonate is obtained through a reaction between diethyl pentaerythritol diphosphite and a halogenated derivative (for example, benzyl chloride).

However, as for the pentaerythritol diphosphonate having a specific structure of the present invention, a target object may not be always collected at a high yield with a conventional production method. In the above patent documents, there is no detailed description of the production method and no description of the purity of the target object, and a large number of problems are involved from the viewpoint of industrial-scale production method.

Further, Patent Documents 3 to 6 disclose a method in which the acid value, residual volatile matter, hue, and residual halogen component and ionic halogen component contents of the compound are improved to solve the above problems and report that characteristic properties are improved when thermoplastic resin compositions are produced. However, only with the contents of the descriptions of the specifications of these patent documents, various problems occur when a flame-retardant polymer material product is actually produced, resulting in an unsatisfactory effect.

PRIOR ART DOCUMENTS

Patent Documents (Patent Document 1) JP-A 5-163288
(Patent Document 2) U.S. Pat. No. 4,174,343
(Patent Document 3) Japanese Patent No. 4287095
(Patent Document 4) JP-A 2004-10586
(Patent Document 5) JP-A 2004-10588
(Patent Document 6) JP-A 2004-18380

DISCLOSURE OF THE INVENTION

Problem to be Solved by the Invention

It is an object of the present invention to provide an organic phosphorus-based compound for obtaining a flame-retardant product having high flame retardancy and a good appearance, and a flame retardant and a flame-retardant product comprising the same.

Means for Solving the Problem

The inventors of the present invention found that an organic phosphorus-based compound which satisfies the following requirements (i) to (viii) is obtained by synthesizing an organic phosphorus-based compound (pentaerythritol diphosphonate compound), cleaning it with an aromatic organic solvent and water or an aliphatic organic solvent and pulverizing it. They also found that when the organic phosphorus-based compound which satisfies the specific requirements is used, a flame-retardant product having high flame retardancy and a good appearance is obtained. The present invention was accomplished based on these findings.

That is, according to the present invention, the object of the present invention is attained by the following inventions.

An organic phosphorus-based compound which satisfies the following requirements (i) to (viii) and is represented by the following formula (1):

(i) the organic purity should be not lower than 98%;
(ii) the solubility in 20° C. water should be not higher than 0.1 g/100 g of water;
(iii) the total halogen component content should be not higher than 1,000 ppm;
(iv) the total volatile organic matter content should be not higher than 800 ppm;
(v) the Δ pH value should be not larger than 1.0;
(vi) the volume standard median diameter should be not larger than 30 μm;
(vii) the maximum particle diameter should be not larger than 200 μm; and
(viii) the standard deviation represented by the following formula (6) should be not larger than 20 μm.

Standard deviation=$(d84\%+d16\%)/2$     (6)

d84%: particle diameter at a point where the cumulative curve becomes 84% (μm)
d16%: particle diameter at a point where the cumulative curve becomes 16% (μm)

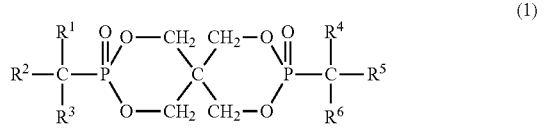
(1)

(In the above formula, $R^2$ and $R^5$ may be the same or different and are each a phenyl group which may have a substituent, naphthyl group which may have a substituent, anthryl group which may have a substituent, or branched or linear alkyl group having 1 to 4 carbon atoms which may have an aromatic substituent. $R^1$, $R^3$, $R^4$ and $R^6$ may be the same or different and are each a hydrogen atom, branched or linear alkyl group having 1 to 4 carbon atoms, phenyl group which may have a substituent, naphthyl group which may have a substituent, or anthryl group which may have a substituent.)

2. The organic phosphorus-based compound in the above paragraph 1, wherein the organic phosphorus-based compound represented by the formula (1) is at least one compound or a mixture of two or more compounds selected from the group consisting of compounds represented by the following formulas (2) to (5).

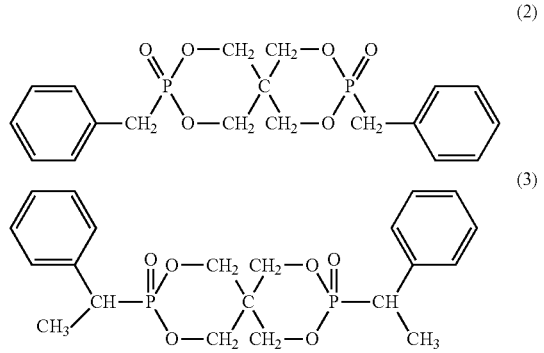
(2)
(3)

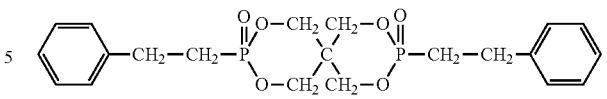
(4)

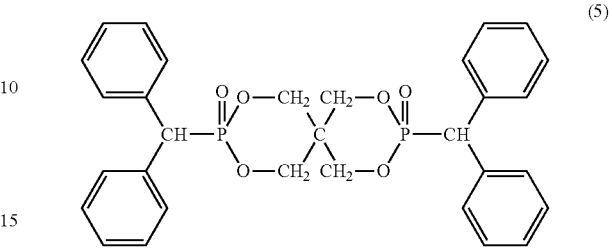
(5)

3. The organic phosphorus-based compound in the above paragraph 1, which has (iii) a total halogen component content of not higher than 500 ppm, (iv) a total volatile organic matter content of not higher than 500 ppm, (v) a Δ pH value of not larger than 0.5, (vi) a volume-standard median diameter of not larger than 20 μm and (vii) a maximum particle diameter of not larger than 150 μm.

4. A flame retardant comprising at least 50 wt % of the organic phosphorus-based compound in the above paragraph 1.

5. A flame-retardant product comprising the flame retardant in the above paragraph 4.

6. A process for producing the organic phosphorus-based compound in the above paragraph 1, comprising the steps of:

cleaning the synthesized organic phosphorus-based compound represented by the formula (1) with an aromatic organic solvent (cleaning step 1);

reflux cleaning the obtained roughly purified product with a compound represented by the following formula (7) or (8) at a cleaning temperature of 35 to 120° C. (cleaning step 2); and $R^9$—OH     (7)

$R^{10}$—C(O)—$R^{11}$     (8)

(wherein $R^9$ is a hydrogen atom, or linear or branched alkyl group having 1 to 6 carbon atoms, and $R^{10}$ and $R^{11}$ may be the same or different and are each a linear or branched alkyl group having 1 to 6 carbon atoms.)

pulverizing the obtained roughly purified product (pulverizing step).

Effect of the Invention

When the organic phosphorus-based compound of the present invention is used as a flame retardant for polymer materials, a flame-retardant product having high flame retardancy and a good appearance can be obtained while retaining the physical properties of a polymer material. When the organic phosphorus-based compound of the present invention is used, a flame-retardant product having a good appearance can be obtained without causing troubles in the processing steps of a polymer material. According to the production process of the present invention, an organic phosphorus-based compound which satisfies the above requirements (i) to (viii) can be obtained.

PRACTICAL EMBODIMENT OF THE INVENTION

<Organic Phosphorus-Based Compound>

In the organic phosphorus-based compound (pentaerythritol diphosphonate compound) represented by the formula (1), $R^2$ and $R^5$ may be the same or different and are each a phenyl group which may have a substituent, naphthyl group which may have a substituent, anthryl group which may have a substituent, or branched or linear alkyl group having 1 to 4 carbon atoms which may have an aromatic substituent.

$R^1$, $R^3$, $R^4$ and $R^6$ may be the same or different and are each a hydrogen atom, branched or linear alkyl group having 1 to 4 carbon atoms, phenyl group which may have a substituent, naphthyl group which may have a substituent, or anthryl group which may have a substituent.

Preferably, $R^2$ and $R^5$ may be the same or different and are each a phenyl group, naphthyl group, anthryl group, benzyl group or phenethyl group, and $R^1$, $R^3$, $R^4$ and $R^6$ may be the same or different and are each a hydrogen atom, methyl group, ethyl group, propyl group, butyl group, phenyl group, toluyl group, naphthyl group or anthryl group. More preferably, $R^2$ and $R^5$ may be the same or different and are each a phenyl group or benzyl group, and $R^1$, $R^3$, $R^4$ and $R^6$ may be the same or different and are each a hydrogen atom, methyl group, ethyl group or phenyl group.

Examples of the compound include 3,9-bis(phenylmethyl)-3,9-dioxo-2,4,8,10-tetraoxa-3,9-diphosphaspiro[5.5]undecane, 3,9-bis((2-methylphenyl)methyl)-3,9-dioxo-2,4,8,10-tetraoxa-3,9-diphosphaspiro[5.5]undecane, 3,9-bis((3-methylphenyl)methyl)-3,9-dioxo-2,4,8,10-tetraoxa-3,9-diphosphaspiro[5.5]undecane, 3,9-bis((4-methylphenyl)methyl)-3,9-dioxo-2,4,8,10-tetraoxa-3,9-diphosphaspiro[5.5]undecane, 3,9-bis((2,4-dimethylphenyl)methyl)-3,9-dioxo-2,4,8,10-tetraoxa-3,9-diphosphaspiro[5.5]undecane, 3,9-bis((2,6-dimethylphenyl)methyl)-3,9-dioxo-2,4,8,10-tetraoxa-3,9-diphosphaspiro[5.5]undecane, 3,9-bis((3,5-dimethylphenyl)methyl)-3,9-dioxo-2,4,8,10-tetraoxa-3,9-diphosphaspiro[5.5]undecane, 3,9-bis((2,4,6-trimethylphenyl)methyl)-3,9-dioxo-2,4,8,10-tetraoxa-3,9-diphosphaspiro[5.5]undecane, 3,9-bis((2-sec-butylphenyl)methyl)-3,9-dioxo-2,4,8,10-tetraoxa-3,9-diphosphaspiro[5.5]undecane, 3,9-bis((4-sec-butylphenyl)methyl)-3,9-dioxo-2,4,8,10-tetraoxa-3,9-diphosphaspiro[5.5]undecane, 3,9-bis((2,4-di-sec-butylphenyl)methyl)-3,9-dioxo-2,4,8,10-tetraoxa-3,9-diphosphaspiro[5.5]undecane, 3,9-bis((2,6-di-1-sec-butylphenyl)methyl)-3,9-dioxo-2,4,8,10-tetraoxa-3,9-diphosphaspiro[5.5]undecane, 3,9-bis((2,4,6-tri-sec-butylphenyl)methyl)-3,9-dioxo-2,4,8,10-tetraoxa-3,9-diphosphaspiro[5.5]undecane, 3,9-bis((2-tert-butylphenyl)methyl)-3,9-dioxo-2,4,8,10-tetraoxa-3,9-diphosphaspiro[5.5]undecane, 3,9-bis((4-tert-butylphenyl)methyl)-3,9-dioxo-2,4,8,10-tetraoxa-3,9-diphosphaspiro[5.5]undecane, 3,9-bis((2,4-di-tert-butylphenyl)methyl)-3,9-dioxo-2,4,8,10-tetraoxa-3,9-diphosphaspiro[5.5]undecane, 3,9-bis((2,6-di-tert-butylphenyl)methyl)-3,9-dioxo-2,4,8,10-tetraoxa-3,9-diphosphaspiro[5.5]undecane, 3,9-bis((2,4,6-tri-tert-butylphenyl)methyl)-3,9-dioxo-2,4,8,10-tetraoxa-3,9-diphosphaspiro[5.5]undecane, 3,9-bis((4-biphenyl)methyl)-3,9-dioxo-2,4,8,10-tetraoxa-3,9-diphosphaspiro[5.5]undecane, 3,9-bis((1-naphthyl)methyl)-3,9-dioxo-2,4,8,10-tetraoxa-3,9-diphosphaspiro[5.5]undecane, 3,9-bis((2-naphthyl)methyl)-3,9-dioxo-2,4,8,10-tetraoxa-3,9-diphosphaspiro[5.5]undecane, 3,9-bis((1-anthryl)methyl)-3,9-dioxo-2,4,8,10-tetraoxa-3,9-diphosphaspiro[5.5]undecane, 3,9-bis((2-anthryl)methyl)-3,9-dioxo-2,4,8,10-tetraoxa-3,9-diphosphaspiro[5.5]undecane, 3,9-bis((9-anthryl)methyl)-3,9-dioxo-2,4,8,10-tetraoxa-3,9-diphosphaspiro[5.5]undecane, 3,9-bis(1-phenylethyl)-3,9-dioxo-2,4,8,10-tetraoxa-3,9-diphosphaspiro[5.5]undecane, 3,9-bis(2-methyl-2-phenylethyl)-3,9-dioxo-2,4,8,10-tetraoxa-3,9-diphosphaspiro[5.5]undecane, 3,9-bis(diphenylmethyl)-3,9-dioxo-2,4,8,10-tetraoxa-3,9-diphosphaspiro[5.5]undecane, 3,9-bis (triphenylmethyl)-3,9-dioxo-2,4,8,10-tetraoxa-3,9-diphosphaspiro[5.5]undecane, 3-phenylmethyl-9-((2,6-dimethylphenyl)methyl)-3,9-dioxo-2,4,8,10-tetraoxa-3,9-diphosphaspiro[5.5]undecane, 3-phenylmethyl-9-((2,4-di-tert-butylphenyl)methyl)-3,9-dioxo-2,4,8,10-tetraoxa-3,9-diphosphaspiro[5.5]undecane, 3-phenylmethyl-9-(1-phenylethyl)-3,9-dioxo-2,4,8,10-tetraoxa-3,9-diphosphaspiro[5.5]undecane, 3-phenylmethyl-9-diphenylmethyl-3,9-dioxo-2,4,8,10-tetraoxa-3,9-diphosphaspiro[5.5]undecane, 3-((2,6-dimethylphenyl)methyl)-9-(1-phenylethyl)-3,9-dioxo-2,4,8,10-tetraoxa-3,9-diphosphaspiro[5.5]undecane, 3-((2,4-di-tert-butylphenyl)methyl)-9-(1-phenylethyl)-3,9-dioxo-2,4,8,10-tetraoxa-3,9-diphosphaspiro[5.5]undecane, 3-diphenylmethyl-9-(1-phenylethyl)-3,9-dioxo-2,4,8,10-tetraoxa-3,9-diphosphaspiro[5.5]undecane, 3-diphenylmethyl-9-((2,6-dimethylphenyl)methyl)-3,9-dioxo-2,4,8,10-tetraoxa-3,9-diphosphaspiro[5.5]undecane and 3-diphenylmethyl-9-((2,4-di-tert-butylphenyl)methyl)-3,9-dioxo-2,4,8,10-tetraoxa-3,9-diphosphaspiro[5.5]undecane.

Particularly preferred are 3,9-bis(phenylmethyl)-3,9-dioxo-2,4,8,10-tetraoxa-3,9-diphosphaspiro[5.5]undecane (compound of the following formula (2)), 3,9-bis(1-phenylethyl)-3,9-dioxo-2,4,8,10-tetraoxa-3,9-diphosphaspiro[5.5] undecane (compound of the following formula (3)), 3,9-bis(2-phenylethyl)-3,9-dioxo-2,4,8,10-tetraoxa-3,9-diphosphaspiro[5.5]undecane (compound of the following formula (4)), and 3,9-bis(diphenylmethyl)-3,9-dioxo-2,4,8, 10-tetraoxa-3,9-diphosphaspiro[5.5]undecane (compound of the following formula (5)), which are represented by the following formulas (2) to (5), respectively.

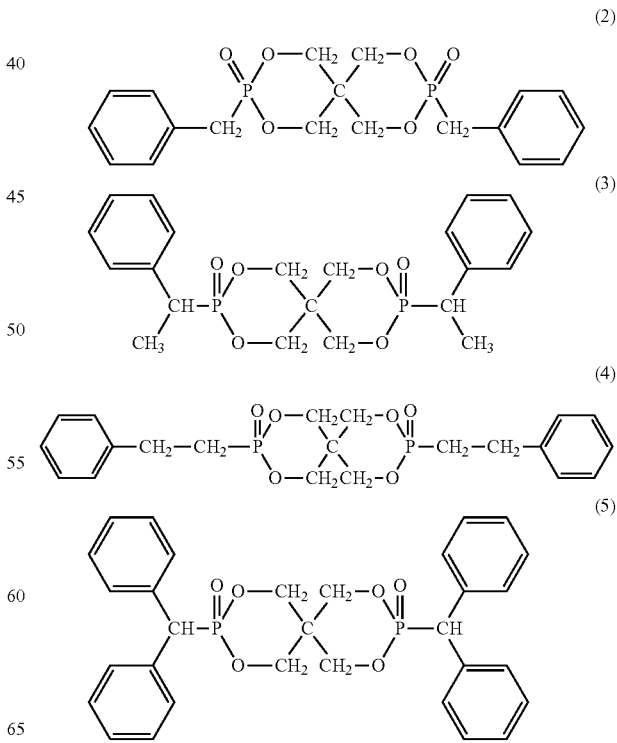

(i) Organic Purity

The organic purity (i) of the organic phosphorus-based compound represented by the formula (1) is not lower than 98%, preferably not lower than 98.5%, particularly preferably not lower than 99.0%.

The organic purity (i) can be measured at a column temperature of 40° C. with a gradient program consisting of from 0 to 12 minutes for 50% acetonitrile, from 12 to 17 minutes for from 50 to 80% acetonitrile, from 17 to 27 minutes for 80% acetonitrile, from 27 to 34 minutes for from 80 to 100% acetonitrile and from 34 to 60 minutes for 100% acetonitrile by using the Separations Module 2690 of Waters Corporation as an HPLC apparatus, the Dual λ Absorbance Detector 2487 (UV of 264 nm) of Waters Corporation as a detector, the TSKgel ODS-120T 2.0 mm×150 mm (5 μm) of Tosoh Corporation as a column and a mixed solution of distilled water and acetonitrile as an eluant. After 50±0.5 mg of the organic phosphorus-based compound is dissolved in 25 ml of acetonitrile, the resulting solution is filtered with a PTFE filter having a pore diameter of 0.2 μm to measure the organic purity. The purity is calculated as area %.

(ii) Solubility in 20° C. Water

The solubility in 20° C. water of the organic phosphorus-based compound represented by the formula (1) is not higher than 0.1 g/100 g of water, preferably not higher than 0.08 g/100 g of water, more preferably not higher than 0.05 g/100 g of water.

The solubility in 20° C. water (ii) can be measured by adding the organic phosphorus-based compound of the present invention little by little to 100 g of distilled water adjusted to 20° C., stirring it for 1 minute for each addition and checking dissolution visually.

(iii) Total Halogen Component Content

The total halogen component content (iii) of the organic phosphorus-based compound represented by the formula (1) is not higher than 1,000 ppm, preferably not higher than 800 ppm, more preferably not higher than 500 ppm, much more preferably not higher than 300 ppm, particularly preferably not higher than 100 ppm. The total halogen component content (iii) is measured by a method in accordance with JIS K 7229.

(iv) Total Volatile Organic Matter Content

The total volatile organic matter content (iv) of the organic phosphorus-based compound represented by the formula (1) is not higher than 800 ppm, preferably not higher than 600 ppm, more preferably not higher than 500 ppm, much more preferably not higher than 400 ppm.

The total volatile organic matter content (iv) can be measured at a column temperature of 40° C. with a gradient program consisting of from 0 to 12 minutes for 50% acetonitrile, from 12 to 17 minutes for from 50 to 80% acetonitrile, from 17 to 27 minutes for 80% acetonitrile, from 27 to 34 minutes for from 80 to 100% acetonitrile and from 34 to 60 minutes for 100% acetonitrile by using the Separations Module 2690 of Waters Corporation as an HPLC apparatus, the Dual λ Absorbance Detector 2487 (UV of 264 nm) of Waters Corporation as a detector, the TSKgel ODS-120T 2.0 mm×150 mm (5 μm) of Tosoh Corporation as a column and a mixed solution of distilled water and acetonitrile as an eluant. After 50±0.5 mg of the organic phosphorus-based compound is dissolved in 25 ml of acetonitrile, the resulting solution is filtered with a PTFE filter having a pore diameter of 0.2 μm to measure the content. A calibration curve is drawn for the volatile organic matter used at the time of producing the compound in advance to obtain the amount of the residual volatile organic matter contained in the organic phosphorus-based compound.

(v) ΔpH value

The ΔpH value (v) of the organic phosphorus-based compound represented by the formula (1) is not larger than 1.0, preferably not larger than 0.8, more preferably not larger than 0.5.

The ΔpH value can be measured by the following method using a commercially available pH measuring instrument. 1 g of a dispersant is added to 99 g of distilled water used for the measurement and stirred to measure the pH of the obtained aqueous solution (the measurement value is designated as pH1). After 1 g of the organic phosphorus-based compound (1) of the present invention is added to the aqueous solution and stirred for 1 minute, the organic phosphorus-based compound (1) is filtered. The pH of the obtained filtrate is measured (the measurement value is designated as pH2). The ΔpH value of the present invention is calculated from the following equation (I).

$$\Delta\text{pH value} = |\text{pH1} - \text{pH2}| \tag{I}$$

(vi) Volume Standard Median Diameter, (vii) Maximum Particle Diameter, (viii) Standard Deviation The volume standard median diameter (vi) of the organic phosphorus-based compound represented by the formula (1) is not larger than 30 μm, preferably not larger than 25 μm, more preferably not larger than 20 μm, particularly preferably not larger than 15 μm.

The maximum particle diameter (vii) of the organic phosphorus-based compound represented by the formula (1) is not larger than 200 μm, preferably not larger than 180 μm, more preferably not larger than 150 μm.

The standard deviation represented by the following equation (6) (viii) of the organic phosphorus-based compound represented by the formula (1) is not larger than 20 μm, preferably not larger than 18 μm, more preferably not larger than 15 μm, much more preferably not larger than 12 μm.

$$\text{Standard deviation} = (d84\% + d16\%)/2 \tag{6}$$

d84%: particle diameter at a point where the cumulative curve becomes 84% (μm)

d16%: particle diameter at a point where the cumulative curve becomes 16% (μm)

The volume standard median diameter (vi), the maximum particle diameter (vii) and the standard deviation (viii) can be measured by using the microtrack of Nikkiso Co., Ltd. and measurement conditions that the particles should be transparent and that the particle shape should be nonspherical.

In the present invention, when any one of the organic purity (i), solubility in 20° C. water (ii), total halogen component content (iii), total volatile organic matter content (iv), ΔpH value (v), volume standard median diameter (vi), maximum particle diameter (vii) and standard deviation (viii) of the organic phosphorus-based compound represented by the formula (1) is outside the predetermined range, various problems occur such as the reduction of storage stability of the flame retardant and the deterioration of processability at the time of thermal processing and the hue and surface appearance of a flame-retardant product. Especially when the organic phosphorus-based compound represented by the formula (1) becomes a high-melting point compound and has a large volume median diameter (vi) and a large maximum particle diameter (vii), a poor appearance may be obtained by the reduction of dispersibility, or a flame retarding effect may be reduced according to conditions.

The melting point of the organic phosphorus-based compound is preferably not lower than 200° C., more preferably not lower than 220° C., much more preferably not lower than 230° C. The melting point of the phosphorus-based compound can be easily measured by using a differential scanning calorimeter.

<Production Process of Organic Phosphorus-Based Compound>

The organic phosphorus-based compound of the present invention can be produced by cleaning and pulverizing after it is synthesized by the following process.

(Synthesizing Step)

The organic phosphorus-based compound represented by the following formula (1) can be synthesized by the following process.

The organic phosphorus-based compound can be obtained by reacting pentaerythritol with phosphorus trichloride, oxidizing the reaction product, treating the oxidized product with an alkali metal compound such as sodium methoxide and then reacting the treated product with aralkyl halide.

The organic phosphorus-based compound can also be obtained by a process in which pentaerythritol is reacted with aralkyl phosphonic acid dichloride or a process in which a compound obtained by reacting pentaerythritol with phosphorus trichloride is reacted with aralkyl alcohol and then Arbuzov transfer is carried out at a high temperature. The latter reaction is disclosed, for example, in U.S. Pat. No. 3,141,032, JP-A 54-157156 and JP-A 53-39698.

Synthesis can be carried out by the following methods.

(I) Compound Represented by Formula (2) Out of Organic Phosphorus-Based Compounds;

This is obtained by reacting pentaerythritol with phosphorus trichloride, adding benzyl bromide to a reaction product between the obtained reaction product and benzyl alcohol and then carrying out an Arbuzov transfer reaction at a high temperature.

(II) Compound Represented by Formula (3) Out of Organic Phosphorus-Based Compounds This can be obtained by reacting pentaerythritol with phosphorus trichloride, oxidizing the reaction product with tertiary butanol, treating the oxidized product with sodium methoxide and reacting the treated product with 1-phenylethyl bromide.

(III) Compound Represented by Formula (4) Out of Organic Phosphorus-Based Compounds This can be obtained by reacting pentaerythritol with phosphorus trichloride, oxidizing the reaction product with tertiary butanol, treating the oxidized product with sodium methoxide and reacting the treated product with 2-phenylethyl bromide.

(IV) Compound Represented by Formula (5) Out of Organic Phosphorus-Based Compounds This can be obtained by reacting pentaerythritol with diphenylmethyl phosphonic acid dichloride.

Alternatively, it can be obtained by reacting pentaerythritol with phosphorus trichloride, adding a catalyst to a reaction product between the obtained product and diphenyl methyl alcohol and carrying out an Arbuzoc transfer reaction at a high temperature.

(Cleaning Steps 1 and 2)

The cleaning step is a step for cleaning the synthesized organic phosphorus-based compound with a solvent to remove impurities. The cleaning step includes cleaning step 1 and cleaning step 2.

The cleaning step 1 is a step for cleaning the organic phosphorus-based compound with an aromatic organic solvent such as xylene or toluene. In the cleaning step 1, repulp cleaning in which cleaning and filtering are repeated several times is preferred. Impurities such as a bromine compound can be efficiently removed in this cleaning step 1. The amount of the aromatic organic solvent is preferably 0.1 to 5 moles/L, more preferably 0.3 to 3 moles/L in terms of the molarity of the organic phosphorus-based compound used in the present invention.

The cleaning step 2 is a step for reflux cleaning the obtained roughly purified product with a compound represented by the following formula (7) or (8) at a cleaning temperature of 35 to 120° C.

$$R^9—OH \quad (7)$$

$$R^{10}—C(O)—R^{11} \quad (8)$$

($R^9$ is a hydrogen atom or linear or branched alkyl group having 1 to 6 carbon atoms, and $R^{10}$ and $R^{11}$ may be the same or different and are each a linear or branched alkyl group having 1 to 6 carbon atoms.)

Reflux cleaning is a method for purifying a roughly purified product by heating the roughly purified product and a solvent under agitation in a reaction vessel having a capacitor and stirrer to evaporate the solvent, cooling the evaporated solvent with the capacitor and returning it into the reaction vessel.

Examples of the compound represented by $R^9$—OH include water, methanol, ethanol, propanol, isopropyl alcohol and butanol. Examples of the compound represented by $R^{10}$—C(O)—$R^{11}$ include acetone, methyl ethyl ketone and methyl isobutyl ketone. Out of these, methanol is preferred from the viewpoints of economy and operationability.

The cleaning temperature is 35 to 120° C. Within this range, it is rarely possible that the formed organic phosphorus-based compound is decomposed, a high cleaning effect is obtained, and cleaning does not need to be repeated many times to obtain an organic phosphorus-based compound having a reduced content of residual volatile matter, which is preferred from the viewpoint of production efficiency. By employing the above cleaning method, the powdery organic phosphorus-based compound becomes a flaky crystal and has excellent drying property.

The amount of the solvent is preferably 0.1 to 5 moles/L, more preferably 0.3 to 3 moles/L in terms of the molarity of the organic phosphorus-based compound used in the present invention. Within this range, the amount of the solvent used for cleaning becomes small, which is preferred from the economic point of view. Further, the concentration of the slurry is low and the viscosity is appropriate, thereby reducing a load on the stirrer advantageously. Since the concentration of the slurry becomes low, cleaning efficiency becomes high and cleaning does not need to be repeated many times to obtain a high-purity organic phosphorus-based compound, which is preferred from the viewpoint of production efficiency.

The cleaning time is preferably 4 hours or more, more preferably 6 hours or more. In the cleaning step 2, the addition or replacement of the solvent is not carried out and the solvent cooled with the capacitor is merely returned into the reaction vessel. At the end of the cleaning step 2, preferably, the temperature of the reaction vessel is reduced to room temperature and the crystal is separated by filtration and cleaned with the solvent.

(Drying Step)

The drying step is a step for drying the cleaned organic phosphorus-based compound. The organic phosphorus-based compound is preferably dried before the pulverizing step.

(Pulverizing Step)

The pulverizing step is a step for pulverizing the obtained cleaned organic phosphorus-based compound to adjust the volume standard median diameter (vi), maximum particle diameter (vii) and standard deviation represented by the formula (6) (viii) to respective predetermined ranges.

Pulverizing is preferably carried out with an air flow pulverizer which pulverizes a raw material with a high-speed eddy current produced on the rear surface of a high-speed rotating part and high-frequency pressure oscillation. Preferably, the cleaned organic phosphorus-based compound is supplied into an air flow pulverizer together with air to provide a rotational flow to the compound so that it is accelerated and dispersed with a distributor, dispensed equally to pulverizing chambers and pulverized with an impact and a high-speed eddy current produced between a blade and a liner in the pulverizing chambers. As the air flow pulverizer, the turbo mill of Freund-Turbo Corporation is used. The number of revolutions of a rotator is preferably 3,000 to 7,000 rpm.

<Flame Retardant>

The flame retardant of the present invention has a content of the organic phosphorus-based compound represented by the formula (1) of not lower than 50 wt %, preferably not lower than 60 wt %, more preferably not lower than 70 wt %, much more preferably not lower than 80 wt %. When the content of the organic phosphorus-based compound is lower than 50 wt %, a flame retarding effect becomes low, thereby making it impossible to obtain a flame-retardant product having desired flame retardancy.

A compound (component A) which can be mixed with the organic phosphorus-based compound represented by the formula (1) of the present invention is not particularly limited. However, it is preferably a non-halogen-based compound from the principal object of the present invention. In general, the component A is used to reduce the amount of the organic phosphorus-based compound represented by the formula (1) of the present invention and improve the flame retardancy and physical and chemical properties of a flame-retardant product.

Examples of the component A include other flame retardants and flame-retardant auxiliaries. The other flame retardants include inorganic phosphorus-based flame retardants typified by red phosphorus and ammonium polyphosphate and organic phosphorus-based flame retardants such as monomer-type phosphoric acid ester-based flame retardants typified by triaryl phosphate, condensate type phosphoric acid ester-based flame retardants typified by resorcinol diphenyl phosphate and bisphenol A diphenyl phosphate, phosphonate type flame retardants, phosphonic acid metal salt-based flame retardants, phosphinate-based flame retardants and phosphinic acid metal salt-based flame retardants. Phosphorus nitrogen-based flame retardants typified by melamine polyphosphate and phosphazene compounds (not limited to linear and cyclic types) may also be used. Further, silicone-based flame retardants and inorganic flame retardants typified by aluminum hydroxide and magnesium hydroxide may also be used. Inorganic flame retardants are not suitable for uses in which transparency is required. An organic or inorganic flame-retardant auxiliary may be used as well.

<Fire Retardant>

The organic phosphorus-based compound (pentaerythritol diphosphonate) of the present invention is advantageously used as a fire retardant for fibers. The fire retardant for fibers can be obtained by mixing 1 to 300 parts by weight of the organic phosphorus-based compound represented by the formula (1) with 100 parts by weight of a dispersant.

As the dispersant, water, an organic solvent or a resin (including a solution, emulsion and latex) is preferably used.

To prepare the fire retardant, the organic phosphorus-based compound represented by the formula (1) is preferably mixed with and dispersed in water, an organic solvent, or a resin solution, resin emulsion or latex. The above surfactant, stabilizer and other fire retardant may be used as required.

The amount of the organic phosphorus-based compound represented by the formula (1) to be mixed is preferably 5 to 200 parts by weight, more preferably 10 to 100 parts by weight, particularly preferably 20 to 50 parts by weight based on 100 parts by weight of the dispersant. When the amount of the organic phosphorus-based compound represented by the formula (1) is smaller than 1 part by weight, a flame-proofing effect may become unsatisfactory and when the amount is larger than 300 parts by weight, the formation of a resin film may become worse, whereby the quality of a fiber product may deteriorate.

A fire-proof fiber product is produced by adhering 3 to 150 wt % as the solid content of the obtained fire retardant for fibers to a fiber product. The solid content adhered is preferably 7 to 100 wt %, particularly preferably 15 to 70 wt %. When the solid content adhered is lower than 3 wt %, a flame-proofing effect becomes unsatisfactory and when the solid content is higher than 150 wt %, the quality of a fiber product deteriorates. Although the processing method is not particularly limited, an immersion method, spray method, brush coating method, uptake method (dye same-bath method) and thermo-sol method which have been carried out are generally employed.

Although the fiber product is not particularly limited, typical examples thereof include curtains, carpets, rugs, artificial lawns, wall materials, chair upholstery, flags (banners), car sheets, car mats, nonwoven filters, artificial leather and electromagnetic shield materials. Although the type of the fiber material is not particularly limited, typical examples thereof include synthetic fibers such as polyester, nylon, acrylonitrile and polypropylene fibers, cellulose-based fibers such as rayon, cotton and hemp fibers, and animal fibers such as wool, silk and feather fibers which may be used alone or in combination.

<Flame Retardant for Synthetic Leather>

The organic phosphorus-based compound of the present invention is also advantageously used as a flame retardant for artificial leather. The method of producing flame-retardant synthetic leather is not particularly limited and may be either a wet method or dry method.

The wet method as used herein is a method in which a skin resin dissolved in a solvent to a predetermined concentration is coated on a fiber substrate and solidified in a coagulation bath containing a poor solvent while a large number of fine open pores are formed in the resin layer like a sponge, and the resin layer is rinsed and dried to obtain a product.

The dry method is a direct coating method in which a skin resin dissolved in a solvent to a predetermined concentration is coated on a fiber substrate by a known coating method and solidified by volatilizing the solvent with a drier, or a method in which a skin resin is applied to release paper by the same known coating method and dried to form a skin resin layer. The release paper is available in silicone and polypropylene types, and the surface treated shape thereof is available in flat, enamel, mat and embossed types. They are not limited. Then, there is a lamination method in which a polyurethane resin-based adhesive is applied to this skin resin layer by a known coating method to bond it to a fiber substrate by thermal pressure bonding to obtain a product. Stated more specifically, the flame-retardant synthetic leather can be produced by the following method.

A composition containing a skin resin (for example, polyurethane resin) is applied to release paper and optionally thermally treated and aged to form a skin resin layer. Then, a composition containing an adhesive (for example, hot melt polyurethane) which is molten by heating is applied to the surface of the skin resin layer to bond it to a fiber substrate while the prepolymer composition has viscosity modifying property, and the composition is cooled to room temperature and aged to form an adhesive layer. At the end, the release paper is removed.

The skin resin composition is preferably a processing liquid prepared by adding the organic phosphorus-based compound represented by the formula (1) and optionally a crosslinking agent and a pigment to a skin resin emulsion or skin resin solution and uniformly dispersing them.

To apply the skin resin composition (processing liquid) to release paper, various known methods may be employed and not particularly limited. Methods using a device such as reverse roll coater, spray coater, roll coater, gravure coater, kiss roll coater, knife coater, comma coater or T-die coater may be employed. Out of these, coating with a knife coater or comma coater is preferred as a uniform thin film layer can be formed.

The composition containing an adhesive is preferably a processing liquid prepared by adding the organic phosphorus-based compound represented by the formula (1) and optionally a crosslinking agent to a resin emulsion or resin solution for adhesive layers and uniformly dispersing them. To coat the composition containing an adhesive (processing liquid) to the skin resin layer, the above-described conventionally known methods may be employed.

<Flame-Retardant Resin Composition>

The organic phosphorus-based compound of the present invention is advantageously used as a flame retardant for styrene-based resin (such as impact-resistant polystyrene, polystyrene, ABS resin, etc.), polyester resin, polylactic acid resin, polycarbonate resin, polyamide resin and epoxy resin. The amount of the organic phosphorus-based compound is preferably 1 to 100 parts by weight, more preferably 3 to 70 parts by weight, much more preferably 5 to 50 parts by weight, particularly preferably 10 to 30 parts by weight based on 100 parts by weight of the resin.

The flame-retardant resin composition has extremely high flame retardancy and is useful as a material for molding various molded articles such as home electric appliance parts, electric and electronic parts, auto parts, mechanical and mechanism parts, and cosmetic containers. More specifically, it can be advantageously used in breaker parts, switch parts, motor parts, ignition coil cases, power plugs, power receptacles, coil bobbins, connectors, relay cases, fuse cases, flyback transformer parts, focus block parts, distributor caps and harness connectors. Further, it is useful for housings, casings and chasses which are becoming thinner, for example, housings, casings and chassis for electronic and electric products (for example, home electric appliances and OA equipment such as telephones, personal computers, printers, facsimiles, copiers, video decks and audio equipment, and parts thereof). It is also useful in housings and fixing unit parts for printers and mechanical and mechanism parts for home electric appliances and OA products such as facsimiles, all of which require excellent heat resistance and flame retardancy.

EXAMPLES

The following examples are provided for the purpose of further illustrating the present invention but the technical scope of the present invention is not limited by these examples. "%" in the examples means wt % unless otherwise noted, and evaluations were made by the following methods.

(1) Characteristic Properties of Organic Phosphorus-Based Compound (i) Organic Purity This was measured at a column temperature of 40° C. with a gradient program consisting of from 0 to 12 minutes for 50% acetonitrile, from 12 to 17 minutes for from 50 to 80% acetonitrile, from 17 to 27 minutes for 80% acetonitrile, from 27 to 34 minutes for from 80 to 100% acetonitrile and from 34 to 60 minutes for 100% acetonitrile by using the Separations Module 2690 of Waters Corporation as an HPLC apparatus, the Dual λ Absorbance Detector 2487 (UV of 264 nm) of Waters Corporation as a detector, the TSKgel ODS-120T 2.0 mm×150 mm (5 μm) of Tosoh Corporation as a column and a mixed solution of distilled water and acetonitrile as an eluant. After 50±0.5 mg of the organic phosphorus-based compound was dissolved in 25 ml of acetonitrile, the resulting solution was filtered with a PTFE filter having a pore diameter of 0.2 μm to measure the organic purity. The purity was calculated as area %.

(ii) Solubility in 20° C. Water

Dissolution was visually checked after the organic phosphorus-based compound was added little by little to 100 g of distilled water adjusted to 20° C. and stirred for 1 minute for each addition. The maximum amount of the organic phosphorus-based compound which was confirmed to be dissolved was taken as solubility in 20° C. water (ii).

(iii) Total Halogen Component Content

This was measured in accordance with JIS K 7229.

(iv) Total Volatile Organic Matter Content

This was measured at a column temperature of 40° C. with a gradient program consisting of from 0 to 12 minutes for 50% acetonitrile, from 12 to 17 minutes for from 50 to 80% acetonitrile, from 17 to 27 minutes for 80% acetonitrile, from 27 to 34 minutes for from 80 to 100% acetonitrile and from 34 to 60 minutes for 100% acetonitrile by using the Separations Module 2690 of Waters Corporation as an HPLC apparatus, the Dual λ Absorbance Detector 2487 (UV of 264 nm) of Waters Corporation as a detector, the TSKgel ODS-120T 2.0 mm×150 mm (5 μm) of Tosoh Corporation as a column and a mixed solution of distilled water and acetonitrile as an eluant. After 50±0.5 mg of the organic phosphorus-based compound was dissolved in 25 ml of acetonitrile, the resulting solution was filtered with a PTFE filter having a pore diameter of 0.2 μm to measure the total volatile organic matter content (iv). A calibration curve was drawn for the volatile organic matter used at the time of production to obtain the amount of the residual volatile organic matter contained in the organic phosphorus-based compound.

(v) ΔpH Value

This was measured by the following method using a pH measuring instrument (HORIBA pH METER D-52 of HORIBA, LTD.). 1 g of a dispersant (phenol type nonionic surfactant) was added to 99 g of distilled water used for the measurement and stirred to measure the pH of the obtained aqueous solution (the measurement value was designated as pH1). After 1 g of the organic phosphorus-based compound was added to the aqueous solution and stirred for 1 minute, the organic phosphorus-based compound was filtered. The pH of the obtained filtrate was measured (the measurement value was designated as pH2). The ΔpH value was calculated from the following equation (I).

$$\Delta \text{pH value} = |\text{pH1} - \text{pH2}| \tag{I}$$

(vi) Volume Standard Median Diameter, (vii) Maximum Particle Diameter, (viii) Standard Deviation They were measured by using the Microtrack HRA of Nikkiso Co., Ltd. The measurement conditions are that the particles should be transparent, the particle shape should be nonspherical, the refractive index of the particles should be 1.60, and the refractive index of the solvent should be 1.33.

(2) Flame Resistance

Flame resistance was evaluated in accordance with FMVSS-302. For evaluation, the burn distance from the time when the flame travels from the bench mark, the burn time from the time when the flame travels from the bench mark and the burn rate from the time when the flame travels from the bench mark specified in FMVSS-302 were measured three times. Noncombustion means that fire self-extinguishes below the bench mark and delayed combustion means that fire self-extinguishes 5 cm or less from the bench mark within 60 seconds. An organic phosphorus-based compound whose burn rate exceeds 10 cm/sec is not acceptable.

(3) Flame Retardancy

This was evaluated based on the UL-94 vertical flammability test of the US UL standard. Five test samples were used as a set in the test, and a flame was applied to each test sample for 10 seconds twice. Test samples which were totally burn with first flame application were not tested. After first flame application, the burn time was measured after the flame was removed, and second flame application was carried out after the flame went off. After second flame application, the burn time was measured after the flame was removed. A total of 10 burn times can be measured in the test made on each set of five test samples. When all the test samples self-extinguish within 10 seconds after the flame is removed, the total of ten burn times is no longer than 50 seconds, and samples do not drip flaming particles or these particles do not cause the ignition of cotton, flame retardancy is rated V-0. When all the test samples self-extinguish within 30 seconds after the flame is removed, the total of 10 burn times is no longer than 250 seconds, and the samples do not drip flaming particles or these particles do not cause the ignition of cotton, flame retardancy is rated V-1, and when all the test samples self-extinguish within 30 seconds after the flame is removed, the total of 10 burn times is no longer than 250 seconds, and the test samples drips flaming particles which cause the ignition of cotton, flame retardancy is rated V-2. The test samples which are rated below these are notV.

(4) Chalking Test

A test sample having an appropriate size was cut out from each of sheet cloths manufactured in Examples and Comparative Examples, and the resin processed surface thereof was scratched with nails to check the degree of whitening.

The evaluation criteria are given below.

○: rarely whitened

Δ: whitened but powders rarely drop

X: whitened and powders drop in large quantities (5) Evaluation of Appearance

The appearance of each test sample was visually checked and evaluated based on the following criteria.

○: no agglomerates or good hue and appearance

Δ: a small number of agglomerates or moderate hue and appearance

X: a large number of agglomerates or bad hue and appearance

Example 1

Preparation of 2,4,8,10-tetraoxa-3,9-diphosphaspiro[5.5]undecane,3,9-dibenzyl-3,9-dioxide (Compound Represented by Formula (2), FR-1)

(Synthesizing Step)

22.55 g (0.055 mole) of 3,9-dibenzyloxy-2,4,8,10-tetraoxa-3,9-diphosphaspiro[5.5]undecane, 19.01 g (0.11 mole) of benzyl bromide and 33.54 g (0.32 mole) of xylene were fed to a reaction vessel having a stirrer, thermometer and capacitor, and dry nitrogen was caused to flow at room temperature under agitation. Then, the reaction product was heated with an oil bath at a reflux temperature (130 to 140° C.) for 4 hours and stirred.

(Cleaning Step 1)

After the end of heating, the resulting solution was left to be cooled to room temperature, and 20 mL of xylene was added and stirred for 30 minutes to precipitate a crystal. The precipitated crystal was separated by filtration and transferred into a beaker having a stirrer, and 20 mL of xylene was added to prepare slurry which was then stirred. Thereafter, the slurry was filtered again, the obtained crystal was transferred into a beaker having a stirrer again, and 20 mL of xylene was added to prepare slurry which was then stirred. Finally, the slurry was filtered to obtain a roughly purified product.

(Cleaning Step 2)

The obtained roughly purified product and 40 mL of methanol were fed to a reaction vessel having a capacitor and stirrer and refluxed for 6 hours (inside temperature of 63° C.). After cooling to room temperature, the crystal was separated by filtration and cleaned with 20 mL of methanol.

(Drying Step)

Thereafter, the obtained product was dried at 120° C. and $1.33 \times 10^2$ Pa for 19 hours to obtain 20.60 g (0.050 mole) of a white flaky crystal. It was confirmed by mass spectral analysis, $^1$H,$^{31}$P nuclear magnetic resonance spectral analysis and elemental analysis that the product was 2,4,8,10-tetraoxa-3,9-diphosphaspiro[5.5]undecane,3,9-dibenzyl-3,9-dioxide.

(Pulverizing Step)

The obtained white flaky crystal was pulverized with a pulverizer (Turbo Mill T400 of FREUND-TURBO Corporation) at 5,000 rpm.

(Characteristic Properties)

The compound had (i) an organic purity of 99.5% and a melting point of 256° C., (ii) a solubility in 20° C. water of 0.01 g/100 g of water, (iii) a total halogen component content of 100 ppm, (iv) a total volatile organic matter content of 200 ppm, (v) a ΔpH value of 0.5, (vi) a volume standard median diameter of 18 μm, (vii) a maximum particle diameter of 150 μm and (viii) a standard deviation of 10.5 μm, all of which were measured by the methods described in this text.

Example 2

Preparation of 2,4,8,10-tetraoxa-3,9-diphosphaspiro[5.5]undecane,3,9-diα-methylbenzyl-3,9-dioxide (Compound Represented by Formula (3), FR-2)

(Synthesizing Step)

816.9 g (6.0 moles) of pentaerythritol, 19.0 g (0.24 mole) of pyridine and 2,250.4 g (24.4 moles) of toluene were fed to a reaction vessel having a thermometer, capacitor and dropping funnel and stirred. 1,651.8 g (12.0 moles) of phosphorus trichloride was added to the reaction vessel by using the dropping funnel and heated at 60° C. under agitation after addition. After the reaction, the obtained reaction product was cooled to room temperature, 5,180.7 g (61.0 moles) of methylene chloride was added to the reaction product, and 889.4 g (12.0 moles) of tertiary butanol and 150.2 g (1.77 moles) of methylene chloride were added dropwise under cooling with ice. The obtained crystal was cleaned with toluene and methylene chloride and filtered. The obtained product was dried at 80° C. and $1.33 \times 10^2$ Pa for 12 hours to obtain 1,341.1 g (5.88 moles) of a white solid. It was confirmed by $^1H,^{31}P$ nuclear magnetic resonance spectral analysis that the obtained solid was 2,4,8,10-tetraoxa-3,9-diphosphaspiro[5.5]undecane,3,9-dihydro-3,9-dioxide.

1,341.0 g (5.88 moles) of the obtained 2,4,8,10-tetraoxa-3,9-diphosphaspiro[5.5]undecane,3,9-dihydro-3,9-dioxide and 6,534.2 g (89.39 moles) of DMF were fed to a reaction vessel having a thermometer, capacitor and dropping funnel and stirred. 648.7 g (12.01 moles) of sodium methoxide was added to the reaction vessel under cooling with ice. After 2 hours of agitation under cooling with ice, agitation was carried out at room temperature for 5 hours. Further, after DMF was distilled off, 2,613.7 g (35.76 moles) of DMF was added, and 2,204.06 g (11.91 moles) of 1-phenylethyl bromide was added dropwise to the reaction mixture under cooling with ice. After 3 hours of agitation under cooling with ice, DMF was distilled off.

(Cleaning Step 1)

The resulting solution was left to be cooled to room temperature, and 2 L of xylene was added and stirred for 30 minutes to precipitate a crystal. The precipitated crystal was separated by filtration and transferred into a beaker having a stirrer, and 2 L of xylene was added to prepare slurry which was then stirred. Thereafter, the slurry was filtered again, the obtained crystal was transferred into a beaker having a stirrer again, and 2 L of xylene was added to prepare slurry which was then stirred. Finally, the slurry was filtered to obtain a roughly purified product.

(Cleaning Step 2)

The obtained roughly purified product and 4 L of methanol were fed to a reaction vessel having a capacitor and stirrer and refluxed for 6 hours (inside temperature of 63° C.). After cooling to room temperature, the crystal was separated by filtration and cleaned with 2 L of methanol.

(Drying Step)

Thereafter, the obtained product was dried at 120° C. and $1.33 \times 10^2$ Pa for 19 hours to obtain 1,845.9 g (4.23 moles) of a white flaky crystal. It was confirmed by mass spectral analysis, $^1H,^{31}P$ nuclear magnetic resonance spectral analysis and elemental analysis that the product was 2,4,8,10-tetraoxa-3,9-diphosphaspiro[5.5]undecane,3,9-diα-methylbenzyl-3,9-dioxide.

(Pulverizing Step)

The obtained white flaky crystal was pulverized with a pulverizer (Turbo Mill T400 of FREUND-TURBO Corporation) at 5,000 rpm.

(Characteristic Properties)

The compound had (i) an organic purity of 99.0%, (ii) a solubility in 20° C. water of 0.01 g/100 g of water, (iii) a total halogen component content of 150 ppm, (iv) a total volatile organic matter content of 220 ppm, (v) a ΔpH value of 0.6, (vi) a volume standard median diameter of 20 μm, (vii) a maximum particle diameter of 160 μm and (viii) a standard deviation of 11.0 μm, all of which were measured by the methods described in this text.

Example 3

Preparation of 2,4,8,10-tetraoxa-3,9-diphosphaspiro[5.5]undecane,3,9-di(2-phenylethyl)-3,9-dioxide (Compound Represented by Formula (4), FR-3)

(Synthesizing Step)

816.9 g (6.0 moles) of pentaerythritol, 19.0 g (0.24 mole) of pyridine and 2,250.4 g (24.4 moles) of toluene were fed to a reaction vessel having a thermometer, capacitor and dropping funnel and stirred. 1,651.8 g (12.0 moles) of phosphorus trichloride was added to the reaction vessel by using the dropping funnel and heated at 60° C. under agitation after addition. After the reaction, the obtained reaction product was cooled to room temperature, 5,180.7 g (61.0 moles) of methylene chloride was added to the obtained product, and 889.4 g (12.0 moles) of tertiary butanol and 150.2 g (1.77 moles) of methylene chloride were added dropwise under cooling with ice. The obtained crystal was cleaned with toluene and methylene chloride and filtered. The obtained product was dried at 80° C. and $1.33 \times 10^2$ Pa for 12 hours to obtain 1,341.1 g (5.88 moles) of a white solid. It was confirmed by $^1H,^{31}P$ nuclear magnetic resonance spectral analysis that the white solid was 2,4,8,10-tetraoxa-3,9-diphosphaspiro[5.5]undecane,3,9-dihydro-3,9-dioxide.

1,341.0 g (5.88 moles) of the obtained 2,4,8,10-tetraoxa-3,9-diphosphaspiro[5.5]undecane, 3,9-dihydro-3,9-dioxide and 6,534.2 g (89.39 moles) of DMF were fed to a reaction vessel having a thermometer, capacitor and dropping funnel and stirred. 648.7 g (12.01 moles) of sodium methoxide was added to the reaction vessel under cooling with ice. After 2 hours of agitation under cooling with ice, agitation was carried out at room temperature for 5 hours. Further, after DMF was distilled off, 2,613.7 g (35.76 moles) of DMF was added, and 2,183.8 g (11.8 moles) of (2-bromoethyl)benzene was added dropwise to the reaction mixture under cooling with ice. After 3 hours of agitation under cooling with ice, DMF was distilled off.

(Cleaning Step 1)

The resulting solution was left to be cooled to room temperature, and 2 L of xylene was added and stirred for 30 minutes to precipitate a crystal. The precipitated crystal was separated by filtration and transferred into a beaker having a stirrer, and 2 L of xylene was added to prepare slurry which was then stirred. Thereafter, the slurry was filtered again, the obtained crystal was transferred into a beaker having a stirrer again, and 2 L of xylene was added to prepare slurry which was then stirred. Finally, the slurry was filtered to obtain a roughly purified product.

(Cleaning Step 2)

The obtained roughly purified product and 4 L of methanol were fed to a reaction vessel having a capacitor and stirrer and refluxed for 6 hours (inside temperature of 63°

C.). After cooling to room temperature, the crystal was separated by filtration and cleaned with 2 L of methanol.
(Drying Step)

Thereafter, the obtained product was dried at 120° C. and 1.33×10² Pa for 19 hours to obtain 1,924.4 g (4.41 moles) of a white flaky crystal. It was confirmed by mass spectral analysis, $^1$H,$^{31}$P nuclear magnetic resonance spectral analysis and elemental analysis that the product was 2,4,8,10-tetraoxa-3,9-diphosphaspiro[5.5]undecane, 3,9-di(2-phenylethyl)-3,9-dioxide.
(Pulverizing Step)

The obtained white flaky crystal was pulverized with a pulverizer (Turbo Mill T400 of FREUND-TURBO Corporation) at 5,000 rpm.
(Characteristic Properties)

The compound had (i) an organic purity of 99.1% and a melting point of 249° C., (ii) a solubility in 20° C. water of 0.01 g/100 g of water, (iii) a total halogen component content of 120 ppm, (iv) a total volatile organic matter content of 250 ppm, (v) a ΔpH value of 0.3, (vi) a volume standard median diameter of 22 μm, (vii) a maximum particle diameter of 140 μm and (viii) a standard deviation of 11.5 μm, all of which were measured by the methods described in this text.

Example 4

Preparation of 2,4,8,10-tetraoxa-3,9-diphosphaspiro[5.5]undecane, 3,9-bis(diphenylmethyl)-3,9-dioxide (Compound Represented by Formula (5), FR-4)

(Synthesizing Step)

2,058.5 g (7.22 moles) of diphenylmethylphosphonic acid dichloride, 468.3 g (3.44 moles) of pentaerythritol, 1,169.4 g (14.8 moles) of pyridine and 8,200 g of chloroform were fed to a 10-L three-necked flask having a stirrer, stirring blade, reflux cooling tube and thermometer, heated up to 60° C. in a nitrogen air stream and stirred for 6 hours.
(Cleaning Step 1)

The resulting solution was left to be cooled to room temperature, and 2 L of xylene was added and stirred for 30 minutes to precipitate a crystal. The precipitated crystal was separated by filtration and transferred into a beaker having a stirrer, and 2 L of xylene was added to prepare slurry which was then stirred. Thereafter, the slurry was filtered again, the obtained crystal was transferred into a beaker having a stirrer again, and 2 L of xylene was added to prepare slurry which was then stirred. Finally, the slurry was filtered to obtain a roughly purified product.
(Cleaning Step 2)

The obtained roughly purified product and 4 L of methanol were fed to a reaction vessel having a capacitor and stirrer and refluxed for 6 hours (inside temperature of 63° C.). After cooling to room temperature, the crystal was separated by filtration and cleaned with 2 L of methanol.
(Drying Step)

Thereafter, the obtained product was dried at 120° C. and 1.33×10² Pa for 19 hours to obtain 1,156.2 g (2.06 moles) of a white flaky crystal. It was confirmed by mass spectral analysis, $^1$H,$^{31}$P nuclear magnetic resonance spectral analysis and elemental analysis that the product was 2,4,8,10-tetraoxa-3,9-diphosphaspiro[5.5]undecane,3,9-bis(diphenylmethyl)-3,9-dioxide.
(Pulverizing Step)

The obtained white flaky crystal was pulverized with a pulverizer (Turbo Mill T400 of FREUND-TURBO Corporation) at 5,000 rpm.

(Characteristic Properties)

The compound had (i) an organic purity of 98.9%, (ii) a solubility in 20° C. water of 0.01 g/100 g of water, (iii) a total halogen component content of 200 ppm, (iv) a total volatile organic matter content of 250 ppm, (v) a ΔpH value of 0.7, (vi) a volume standard median diameter of 25 μm, (vii) a maximum particle diameter of 180 μm and (viii) a standard deviation of 14.0 μm, all of which were measured by the methods described in this text.

Comparative Example 1

Preparation of 2,4,8,10-tetraoxa-3,9-diphosphaspiro[5.5]undecane, 3,9-dibenzyl-3,9-dioxide (Compound Represented by Formula (2), FR-5)

(Pulverizing Step)

2,4,8,10-tetraoxa-3,9-diphosphaspiro[5.5]undecane, 3,9-dibenzyl-3,9-dioxide was synthesized in the same manner as in Example 1 except that pulverization with a pulverizer was not carried out.
(Characteristic Properties)

The compound had (i) an organic purity of 99.5% and a melting point of 256° C., (ii) a solubility in 20° C. water of 0.01 g/100 g of water, (iii) a total halogen component content of 100 ppm, (iv) a total volatile organic matter content of 200 ppm, (v) a ΔpH value of 0.5, (vi) a volume standard median diameter of 40 μm, (vii) a maximum particle diameter of 300 μm and (viii) a standard deviation of 30.0 μm, all of which were measured by the methods described in this text.

Comparative Example 2

Preparation of 2,4,8,10-tetraoxa-3,9-diphosphaspiro[5.5]undecane,3,9-dibenzyl-3,9-dioxide (Compound Represented by Formula (2), FR-6)

(Synthesizing Step)

22.55 g (0.055 mole) of 3,9-dibezyloxy-2,4,8,10-tetraoxa-3,9-diphosphaspiro[5.5]undecane, 19.01 g (0.11 mole) of benzyl bromide and 33.54 g (0.32 mole) of xylene were fed to a reaction vessel having a stirrer, thermometer and capacitor, and dry nitrogen was caused to flow at room temperature under agitation. Then, the reaction product was heated with an oil bath at a reflux temperature (about 130° C.) for 4 hours and stirred. After the end of heating, the reaction product was left to be cooled to room temperature.
(Cleaning Step)

20 mL of xylene was added to the reaction vessel and stirred for 30 minutes. The precipitated crystal was separated by filtration and cleaned with 20 mL of xylene once to obtain a white crystal.
(Drying Step)

Thereafter, the obtained product was dried at 120° C. and 1.33×10² Pa for 24 hours to obtain 21.22 g (0.052 mole) of a white crystal. It was confirmed by mass spectral analysis, $^1$H,$^{31}$P nuclear magnetic resonance spectral analysis and elemental analysis that the product was 2,4,8,10-tetraoxa-3,9-diphosphaspiro[5.5]undecane, 3,9-dibenzyl-3,9-dioxide.
(Pulverizing Step)

The obtained white crystal was pulverized with a pulverizer (Turbo Mill T400 of FREUND-TURBO Corporation).
(Characteristic Properties)

The compound had (i) an organic purity of 97.0% and a melting point of 253° C., (ii) a solubility in 20° C. water of 0.01 g/100 g of water, (iii) a total halogen component content of 1,300 ppm, (iv) a total volatile organic matter content of 1,100 ppm, (v) a ΔpH value of 1.3, (vi) a volume standard median diameter of 21 μm, (vii) a maximum particle diameter of 140 μm and (viii) a standard deviation of 13.5 μm, all of which were measured by the methods described in this text.

The characteristic properties of the organic phosphorus-based compounds obtained in Examples 1 to 4 and Comparative Examples 1 and 2 are shown in Table 1 below.

physical properties were tested. (test cloth): Polyester 100% woven car sheet cloth (weight of 300 g/m²) was used. (processing agent): This was prepared by adding 1.5 parts of a nonionic surfactant, 1 part of a polyacrylic acid-based thickener and 0.5 part of 25% ammonia water to 100 parts of a polyacrylic acid ester emulsion having a solid content of 45% and further adding 30 parts of each of the above organic phosphorus-based compounds (FR-1 to FR-6) under agitation. The obtained processing agent was left to stand at

TABLE 1

| Name | Unit | Ex. 1 FR-1 | Ex. 2 FR-2 | Ex. 3 FR-3 | Ex. 4 FR-4 | C. Ex. 1 FR-5 | C. Ex. 2 FR-6 |
|---|---|---|---|---|---|---|---|
| (i) Organic purity | % | 99.5 | 99.0 | 99.1 | 98.9 | 99.5 | 97.0 |
| (ii) Solubility in 20° C. water | g/100 g of water | 0.01 | 0.01 | 0.01 | 0.01 | 0.01 | 0.01 |
| (iii) Total halogen component content | ppm | 100 | 150 | 120 | 200 | 100 | 1300 |
| (iv) Total volatile organic matter content | ppm | 200 | 220 | 250 | 250 | 200 | 1100 |
| (v) ΔpH value | — | 0.5 | 0.6 | 0.3 | 0.7 | 0.5 | 1.3 |
| (vi) Volume standard median diameter | μm | 18 | 20 | 22 | 25 | 40 | 21 |
| (vii) Maximum particle diameter | μm | 150 | 160 | 140 | 180 | 300 | 140 |
| (viii) Standard deviation | μm | 10.5 | 11.0 | 11.5 | 14.0 | 30.0 | 13.5 |

Ex.: Example
C. Ex.: Comparative Example

The following organic phosphorus-based compounds were used in Examples 5 to 18 and Comparative Examples 3 to 10.
(i) 2,4,8,10-tetraoxa-3,9-disphosphaspiro[5.5]undecane, 3,9-dibenzyl-3,9-dioxide synthesized in Example 1 {phosphorus-based compound of formula (2) (to be referred to as "FR-1" hereinafter)}
(ii) 2,4,8,10-tetraoxa-3,9-disphosphaspiro[5.5]undecane,3,9-diα-methylbenzyl-3,9-dioxide synthesized in Example 2 {phosphorus-based compound of formula (3) (to be referred to as "FR-2" hereinafter)}
(iii) 2,4,8,10-tetraoxa-3,9-disphosphaspiro[5.5]undecane,3,9-di(2-phenylethyl)-3,9-dioxide synthesized in Example 3 {phosphorus-based compound of formula (4) (to be referred to as "FR-3" hereinafter)}
(iv) 2,4,8,10-tetraoxa-3,9-disphosphaspiro[5.5]undecane,3,9-bis(diphenylmethyl)-3,9-dioxide synthesized in Example 4 {phosphorus-based compound of formula (5) (to be referred to as "FR-4" hereinafter)}
(v) 2,4,8,10-tetraoxa-3,9-disphosphaspiro[5.5]undecane,3,9-dibenzyl-3,9-dioxide synthesized in Comparative Example 1 {phosphorus-based compound of formula (2) (to be referred to as "FR-5" hereinafter)}
(vi) 2,4,8,10-tetraoxa-3,9-disphosphaspiro[5.5]undecane,3,9-dibenzyl-3,9-dioxide synthesized in Comparative Example 2 {phosphorus-based compound of formula (2) (to be referred to as "FR-6" hereinafter)}
(vii) Commercially available phosphoric acid ester-based flame retardant (PX-200 of Daihachi Chemical Industry, Co., Ltd., to be referred to as "PX-200" hereinafter)

Examples 5 to 8 and Comparative Examples 3 and 4

<Evaluation of Fire Retardant for Fibers>
After interior car sheet cloth for automobiles was coated with the following processing liquid, its flame resistance and 25° C. for 24 hours to evaluate its storage stability based on the following criteria.

◯: no agglomeration and no sedimentation are seen by visual checking

X: agglomeration and sedimentation are seen by visual checking (processing method): The sheet cloth was coated with the processing agent prepared by the above method by using a doctor knife (processing agent prepared within 3 hours after preparation was used). The deposition amount of the solid matter of the processing agent was 100 g/m². Pre-drying was carried out at 80° C. for 5 minutes, and curing was carried out at 150° C. for 1 minute.

(test results): The results of stability, flame resistance, chalking test and appearance evaluation are shown in Table 2 below.

TABLE 2

|  | Ex. 5 | Ex. 6 | Ex. 7 | Ex. 8 | C. Ex. 3 | C. Ex. 4 |
|---|---|---|---|---|---|---|
| Flame retardant | FR-1 | FR-2 | FR-3 | FR-4 | FR-5 | FR-6 |
| Stability | ◯ | ◯ | ◯ | ◯ | ◯ | X |
| Flame resistance | Incombustible | Incombustible | Incombustible | Incombustible | Incombustible | Late retardant |
| Chalking test | ◯ | ◯ | ◯ | ◯ | X | Δ |
| Evaluation of appearance | ◯ | ◯ | ◯ | ◯ | X | Δ |

Ex.: Example
C. Ex.: Comparative Example

Examples 9 to 12 and Comparative Examples 5 and 6

<Evaluation with Epoxy Resin>

Methyl ethyl ketone was added to 100 parts by weight of the EPICLON N-770 phenol novolak type epoxy resin (manufactured by Dainippon Ink and Chemicals, Inc., epoxy equivalent of 190 g/eq), 5.5 parts by weight of dicyan diamide, 30 parts by weight of each of the organic phosphorus-based compounds (FR-1 to FR-6) and 0.1 part by weight of 2-ethyl-4-methylimidazole to prepare varnish having a nonvolatile content concentration of 50 wt %. This resin varnish was impregnated into 100 parts of glass cloth (thickness of 0.18 mm, manufactured by Nitto Boseki Co., Ltd.) in a solid content of 80 parts and dried in a 150° C. drying furnace for 4 minutes to manufacture a prepreg having a resin content of 44.4%. Eight prepregs were placed one upon another, electrolytic copper foil having a thickness of 35 μm was placed on the front and rear surfaces of the obtained assembly, and thermal pressure molding was carried out at a pressure of $3.9 \times 10^6$ Pa and a temperature of 170° C. for 120 minutes to obtain a laminate sheet covered with copper on both sides and having a thickness of 1.6 mm. The flame retardancy of the obtained laminate sheet was measured. Meanwhile; after the resin varnish prepared above was applied to a glass sheet and dried at room temperature for 1 hour, it was dried in a drying furnace at 80° C. for 1 hour, at 150° C. for 1 hour and at 170° C. for 2 hours. The appearance of the obtained resin was evaluated. The evaluation results are shown in Table 3.

TABLE 3

|  | Ex. 9 | Ex. 10 | Ex. 11 | Ex. 12 | C. Ex. 5 | C. Ex. 6 |
|---|---|---|---|---|---|---|
| Flame retardant | FR-1 | FR-2 | FR-3 | FR-4 | FR-5 | FR-6 |
| Flame retardancy | V-0 | V-0 | V-0 | V-0 | V-0 | V-1 |
| Evaluation of appearance | ○ | ○ | ○ | ○ | X | Δ |

Ex.: Example
C. Ex.: Comparative Example

Examples 13 to 18 and Comparative Examples 7 to 10

<Evaluation with Impact-Resistant Polystyrene Resin>

The amount shown in Table 3 of each of the organic phosphorus-based compounds (FR-1 to FR-6, PX-200) was added to and mixed with 100 parts by weight of commercially available impact-resistant polystyrene (HIPS H9152 of PS Japan Corporation) by means of a tumbler and pelletized at a cylinder temperature of 200° C. by using a 15 mmφ double-screw extruder (KZW15 of Technovel Corporation), and the obtained pellet was dried with a 70° C. hot air drier for 4 hours. The pellet was molded at a cylinder temperature of 210° C. and a mold temperature of 40° C. by an injection molding machine (JSW J75EIII of The Japan Steel Works, Ltd.) to obtain an UL-94 burn test sample having a thickness of 1.6 mm and a sample plate having a thickness of 2 mm. The evaluation results of the flame retardancy and appearance of the obtained molded plate are shown in Table 4.

TABLE 4

|  |  | Ex. 13 | Ex. 14 | Ex. 15 | Ex. 16 | Ex. 17 | Ex. 18 |
|---|---|---|---|---|---|---|---|
| HIPS | Parts by weight | 100 | 100 | 100 | 100 | 100 | 100 |
| Flame retardant | type | FR-1 | FR-2 | FR-3 | FR-4 | FR-1/PX-200 | FR-1/PX-200 |
|  | Parts by weight | 10 | 10 | 10 | 10 | 7/3 | 3/2 |
| Flame retardancy | evaluation | V-2 | V-2 | V-2 | V-2 | V-2 | V-2 |
| Evaluation of appearance |  | — | ○ | ○ | ○ | ○ | ○ |

|  |  | C. Ex. 7 | C. Ex. 8 | C. Ex. 9 | C. Ex. 10 |
|---|---|---|---|---|---|
| HIPS | Parts by weight | 100 | 100 | 100 | 100 |
| Flame retardant | type | FR-5 | FR-6 | FR-6/PX-200 | PX-200 |
|  | Parts by weight | 10 | 10 | 3/2 | 5 |
| Flame retardancy | evaluation | V-2 | V-2 | V-2 | Not V |
| Evaluation of appearance |  | — | Δ | X | X |

Ex.: Example
C. Ex.: Comparative Example

INDUSTRIAL FEASIBILITY

The organic phosphorus-based compound of the present invention is useful for obtaining flame-retardant products having high flame retardancy and a good appearance in various applications.

The invention claimed is:

1. An organic phosphorus-based compound which satisfies the following requirements (i) to (viii) and is represented by the following formula (1):
 (i) the organic purity is not lower than 98%;
 (ii) the solubility in 20° C. water is not higher than 0.1 g/100 g of water;
 (iii) the total halogen component content is not higher than 1,000 ppm;
 (iv) the total volatile organic matter content is not higher than 800 ppm;
 (v) the Δ pH value is not larger than 1.0;
 (vi) the volume standard median diameter is not larger than 30 μm;
 (vii) the maximum particle diameter is not larger than 200 μm; and (viii) the standard deviation represented by the following formula (6) is not larger than 15 μm;

Standard deviation=(d84%+d16%)/2     (6)

d84%: particle diameter at a point where the cumulative curve becomes 84% (μm)
d16%: particle diameter at a point where the cumulative curve becomes 16% (μm)

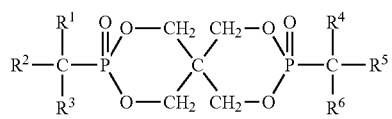     (1)

wherein, in formula (1),
  $R^2$ and $R^5$ may be the same or different and are each a phenyl group which may have a substituent, naphthyl group which may have a substituent, anthryl group which may have a substituent, or branched or linear alkyl group having 1 to 4 carbon atoms which may have an aromatic substituent, and
  $R^1$, $R^3$, $R^4$ and $R^6$ may be the same or different and are each a hydrogen atom, branched or linear alkyl group having 1 to 4 carbon atoms, phenyl group which may have a substituent, naphthyl group which may have a substituent, or anthryl group which may have a substituent.

2. The organic phosphorus-based compound according to claim 1, wherein the organic phosphorus-based compound represented by the formula (1) is at least one compound selected from the group consisting of:

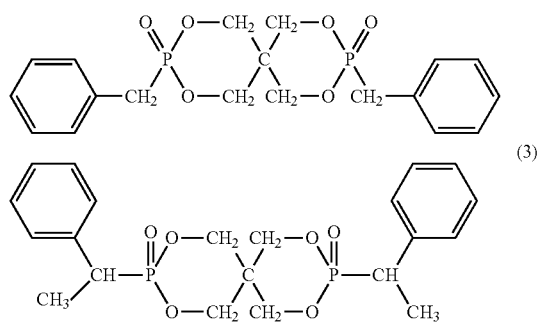

(2)

(3)

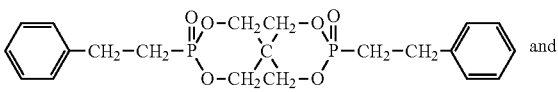 and     (4)

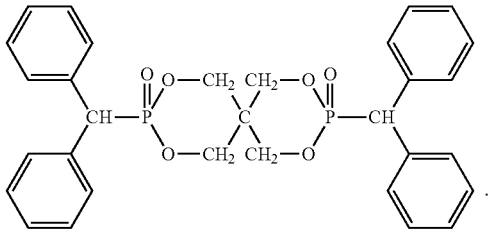     (5)

3. The organic phosphorus-based compound according to claim 1, which has (iii) a total halogen component content of not higher than 500 ppm, (iv) a total volatile organic matter content of not higher than 500 ppm, (v) a Δ pH value of not larger than 0.5, (vi) a volume-standard median diameter of not larger than 20 μm and (vii) a maximum particle diameter of not larger than 150 μm.

4. A flame retardant comprising at least 50 wt % of the organic phosphorus-based compound of claim 1.

5. A flame-retardant product comprising the flame retardant of claim 4.

6. A process for producing the organic phosphorus-based compound of claim 1, comprising the steps of:
  cleaning a synthesized organic phosphorus-based compound represented by the formula (1) with an aromatic organic solvent to obtain a roughly purified product (cleaning step 1);
  reflux cleaning the roughly purified product with a compound represented by the following formula (7) or (8) at a cleaning temperature of 35 to 120° C. to obtain a purified product (cleaning step 2);

$R^9$—OH     (7)

$R^{10}$—C(O)—$R^{11}$     (8)

wherein $R^9$ is a hydrogen atom, or linear or branched alkyl group having 1 to 6 carbon atoms, and $R^{10}$ and $R^{11}$ may be the same or different and are each a linear or branched alkyl group having 1 to 6 carbon atoms; and
  pulverizing the purified product to obtain the organic phosphorus-based compound (pulverizing step).

* * * * *